United States Patent
Zhu (10) Patent No.: US 12,513,742 B2
(45) Date of Patent: Dec. 30, 2025

(54) CHANNEL DETECTION METHOD, COMMUNICATION DEVICE, AND STORAGE MEDIUM

(71) Applicant: BEIJING XIAOMI MOBILE SOFTWARE CO., LTD., Beijing (CN)

(72) Inventor: Yajun Zhu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 460 days.

(21) Appl. No.: 17/924,938

(22) PCT Filed: May 12, 2020

(86) PCT No.: PCT/CN2020/089857
§ 371 (c)(1),
(2) Date: Nov. 11, 2022

(87) PCT Pub. No.: WO2021/226844
PCT Pub. Date: Nov. 18, 2021

(65) Prior Publication Data
US 2023/0199832 A1    Jun. 22, 2023

(51) Int. Cl.
*H04W 74/0808* (2024.01)

(52) U.S. Cl.
CPC .............. *H04W 74/0808* (2013.01)

(58) Field of Classification Search
CPC .............................................. H04W 74/0808
See application file for complete search history.

(56) References Cited

U.S. PATENT DOCUMENTS

| | | | |
|---|---|---|---|
| 2019/0141744 A1* | 5/2019 | Naghshvar | H04B 7/0452 |
| 2019/0215140 A1 | 7/2019 | Hafeez et al. | |
| 2019/0373635 A1* | 12/2019 | Yang | H04W 74/006 |
| 2020/0037366 A1 | 1/2020 | Cui | |
| 2020/0187255 A1 | 6/2020 | Liu et al. | |
| 2020/0344819 A1* | 10/2020 | Myung | H04W 74/0841 |
| 2021/0127400 A1* | 4/2021 | Lin | H04W 72/046 |
| 2021/0274553 A1* | 9/2021 | Xue | H04W 56/0015 |

FOREIGN PATENT DOCUMENTS

| | | |
|---|---|---|
| CN | 106453181 A | 2/2017 |
| CN | 109219152 A | 1/2019 |
| CN | 109413757 A | 3/2019 |
| CN | 109496456 A | 3/2019 |

(Continued)

OTHER PUBLICATIONS

ZTE, "Discussion on channel access mechanism for NR-U", 3GPP TSG RAN WG1 Meeting #94, R1-1808321, Gothenburg, Sweden, Aug. 20-24, 2018, (6p).

(Continued)

*Primary Examiner* — Jason E Mattis
*Assistant Examiner* — Bao G Nguyen
(74) *Attorney, Agent, or Firm* — Arch & Lake LLP; Hao Tan; Shen Wang (57) ABSTRACT

A channel detection method is provided. The method includes: according to a detection sequence of N beams defined by a detection pattern, sequentially performing clear channel assessment (CCA) of an unlicensed frequency band on the N beams, where N is a positive integer equal to or greater than 2.

16 Claims, 5 Drawing Sheets

(56) References Cited

FOREIGN PATENT DOCUMENTS

| | | | |
|---|---|---|---|
| CN | 110495242 A | 11/2019 |
| CN | 110546899 A | 12/2019 |
| WO | 2016119302 A1 | 8/2016 |
| WO | 2018164495 A1 | 3/2018 |
| WO | 2019076170 A1 | 4/2019 |
| WO | 2019160767 A1 | 8/2019 |

OTHER PUBLICATIONS

ZTE, Sanechips, "Discussion on channel access procedure for NR-U" 3GPP TSG RAN WG1 Meeting #96Bis, R1-1903873, Xi'an, China, Apr. 8-12, 2019, (10p).

ZTE, Sanechips, "Discussion on channel access procedure for NR-U", 3GPP TSG RAN WG1 Meeting #98Bis, R1-1909974, Chongqing, China, Oct. 14-20, 2019, (12p).

AT&T, "Closed Loop LBT for License Assisted NR in Unlicensed Bands", 3GPP TSG RAN WG1 Meeting 92bis R1-1804665, Sanya, China, Apr. 16-20, 2018, (5p).

International Search Report issued in Application No. PCT/CN2020/089857 dated Feb. 2, 2021, (4p).

\* cited by examiner

```
┌─────────────────────────────────────────┐
│ According to a detection sequence of N  │  S110
│ beams defined by a detection pattern,   │
│ sequentially perform CCA of an          │
│ unlicensed frequency band on the N      │
│ beams, where N is a positive integer    │
│ equal to or greater than 2              │
└─────────────────────────────────────────┘
```

Fig. 5

```
┌─────────────────────────────────────────┐  S100
│ Determine the detection pattern in      │
│ response to that a sending end is a     │
│ base station                            │
└─────────────────────────────────────────┘
                    │
                    ▼
┌─────────────────────────────────────────┐  S110
│ According to a detection sequence of N  │
│ beams defined by the determined         │
│ detection pattern, sequentially perform │
│ CCA of an unlicensed frequency band on  │
│ the N beams, where N is a positive      │
│ integer equal to or greater than 2      │
└─────────────────────────────────────────┘
```

CHANNEL DETECTION METHOD, COMMUNICATION DEVICE, AND STORAGE MEDIUM

CROSS-REFERENCE TO RELATED APPLICATION

The present application is the U.S. National Stage Application of International Application No. PCT/CN2020/089857 filed on May 12, 2020, the entire content of which is incorporated herein by reference for all purposes.

BACKGROUND

The increase of mobile devices and the rapid development of mobile Internet have brought explosive growth of mobile data, putting forward higher requirements for traffic density, network capacity, user rate, delay, etc. In order to meet the challenges, the new radio (NR) of the fifth generation mobile communication (5G) has carried out a new air interface design for new scenarios and new frequency bands.

The shortage of spectrum resources is a more and more serious reality faced by mobile communication networks. A licensed frequency band, especially low-frequency band resources with high value, is not only limited in bandwidth, but also rapidly consumed by increasing user groups.

In order to meet the challenge of spectrum shortage and increase the system capacity, mobile networks may be considered to be deployed in unlicensed frequency bands. The use of the unlicensed frequency bands will be introduced into a cellular mobile communication system.

SUMMARY

The disclosure relates to the field of wireless communication but is not limited to this, in particular to a channel detection method and apparatus, a communication device, and a storage medium.

A first aspect of the disclosure provides a channel detection method, including:
  according to a detection sequence of N beams defined by a detection pattern, sequentially performing clear channel assessment (CCA) of an unlicensed frequency band on the N beams, where N is a positive integer equal to or greater than 2.

A second aspect of the disclosure provides a communication device, including:
  a transceiver;
  a memory; and
  a processor, connected with the transceiver and the memory respectively and configured to control wireless signal transceiving of the transceiver and implement the following step by executing computer-executable instructions on the memory:
  according to a detection sequence of N beams defined by a detection pattern, sequentially perform CCA of an unlicensed frequency band on the N beams, wherein N is a positive integer equal to or greater than 2.

A third aspect of the disclosure provides a non-transitory computer storage medium that stores computer-executable instructions. The computer-executable instructions can implement the following step after being executed by a processor:
  according to a detection sequence of N beams defined by a detection pattern, sequentially perform CCA of an unlicensed frequency band on the N beams, wherein N is a positive integer equal to or greater than 2.

BRIEF DESCRIPTION OF THE DRAWINGS

The accompanying drawings here are incorporated into the specification and constitute a part of the specification, showing the principles consistent with the examples of the disclosure and used together with the specification to explain the examples of the disclosure.

DETAILED DESCRIPTION

In the related art, a base station of the cellular communication system may send control or data information to a serving terminal through an omnidirectional antenna. In some scenarios, the base station may also send information to the terminal through beam forming, but a serving beam cannot change dynamically. In an NR system of cellular communication, beam-based data transmission is introduced. The base station may send control and data to the serving terminal on a certain beam.

In an unlicensed system that uses the unlicensed frequency bands for communication, it is needed to detect channels of the unlicensed frequency bands before communication, and data are received and sent when channel clear is detected, so as to reduce communication interference.

How to apply beam communication to the unlicensed frequency bands in the cellular communication system to ensure communication quality and achieve compatibility between beam communication and unlicensed frequency band communication simply and conveniently at the same time is a problem that needs to be further solved in the related art.

Examples will be described in detail here, and corresponding instances are shown in the accompanying drawings. When the following description refers to the accompanying drawings, unless otherwise indicated, the same numbers in different drawings indicate the same or similar elements. The implementations described in the following examples do not represent all implementations consistent with the examples of the disclosure. Rather, they are instances of apparatuses and methods consistent with some aspects of the examples of the disclosure as detailed in the appended claims.

The terms used in the examples of the disclosure are for the purpose of describing specific examples, and not intended to limit the examples of the disclosure. The singular forms "one," "said" and "the" used in the examples of the disclosure and the appended claims are also intended to include the majority forms unless the context clearly indicates other meanings. It can also be understood that the term "and/or" as used here refers to and includes any or all possible combinations of one or more associated listed items.

It can be understood that although the terms first, second, third, etc. may be used to describe various information in the examples of the disclosure, such information cannot be limited to these terms. These terms are used to distinguish the same type of information from each other. For example, without departing from the scope of the examples of the disclosure, first information may also be referred to as second information, and similarly, the second information may also be referred to as the first information. Depending on the context, the word "if" as used here can be interpreted as "at the time," "when," or "in response to determining."

Reference throughout this specification to "one embodiment," "an embodiment," "an example," "some embodiments," "some examples," or similar language means that a particular feature, structure, or characteristic described is included in at least one embodiment or example. Features, structures, elements, or characteristics described in connection with one or some embodiments are also applicable to other embodiments, unless expressly specified otherwise.

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

Figure 1:
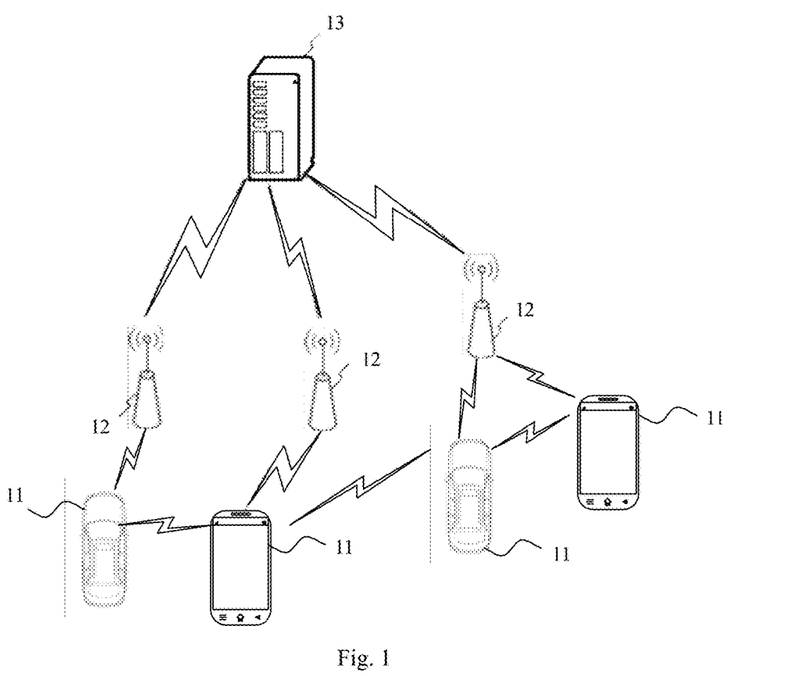
FIG. 1 is a schematic structural diagram of a wireless communication system illustrated according to an example.

Referring to FIG. 1, it shows a schematic structural diagram of a wireless communication system provided by an example of the disclosure. As shown in FIG. 1, the wireless communication system is a communication system based on a cellular mobile communication technology. The wireless communication system may include: a plurality of terminals 11 and a plurality of base stations 12.

The terminals 11 may refer to devices that provide a user with speech and/or data connectivity. The terminals 11 may communicate with one or more core networks via a radio access network (RAN). The terminals 11 may be internet of things terminals, such as a sensor device, a mobile phone (or called a "cellular" phone) and a computer with an internet of things terminal. For example, the terminals may be fixed, portable, pocket-size, handheld, computer built-in or vehicle-mounted apparatuses. For example, the terminals may be stations (STA), subscriber units, subscriber stations, mobile stations, mobiles, remote stations, access points, remote terminals, access terminals, user terminals, user agents, user devices, or user equipment (UE). Or, the terminals 11 may also be unmanned aircraft devices. Or, the terminals 11 may also be vehicle-mounted devices, such as a trip computer with a wireless communication function, or a wireless communication device externally connected with the trip computer. Or, the terminals 11 may also be roadside devices, such as a street lamp, a signal light or other roadside devices with wireless communication functions.

The base stations 12 may be network side devices in the wireless communication system. The wireless communication system may be the 4th generation mobile communication (4G) system, also called a long term evolution (LTE) system; or, the wireless communication system may also be a 5G system, also called a new radio (NR) system or 5G NR system. Or, the wireless communication system may also be a next-generation system of the 5G system. An access network in the 5G system may be called a new generation-radio access network (NG-RAN). Or, it is an MTC system.

The base stations 12 may be evolved base stations (eNBs) adopted in the 4G system. Or, the base stations 12 may also be base stations (gNBs) adopting centralized and distributed architectures in the 5G system. When the base stations 12 adopt the centralized and distributed architectures, they typically each include a central unit (CU) and at least two distributed units (DU). Protocol stacks of a packet data convergence protocol (PDCP) layer, a radio link control (RLC) protocol layer and a media access control (MAC) layer are disposed in the central unit; and protocol stacks of physical (PHY) layers are disposed in the distributed units, and specific implementations of the base stations 12 are not limited in the example of the disclosure.

The base stations 12 and the terminals 11 may establish wireless connection through wireless air interface. In different implementations, the wireless air interface is a wireless air interface based on the 4th generation mobile communication network technology (4G) standard; or, the wireless air interface is a wireless air interface based on the 5th generation mobile communication network technology (5G) standard, such as new radio; or, the wireless air interface may also be a wireless air interface based on the next-generation mobile communication network technology standard of 5G.

In some examples, an end-to-end (E2E) connection may also be established between the terminals 11. For example, vehicle-to-vehicle (V2V) communication, vehicle-to-infrastructure (V2I) communication and vehicle-to-pedestrian (V2P) communication in vehicle-to-everything (V2X) communication and other scenarios.

In some examples, the wireless communication system above may further include a network management device 13.

The plurality of base stations 12 are connected with the network management device 13. The network management device 13 may be a core network device in the wireless communication system, for example, the network management device 13 may be a mobility management entity (MME) in an evolved packet core (EPC). Or, the network management device may also be other core network devices, such as a serving gateway (SGW), a public data network gateway (PGW), a policy and charging rules function (PCRF) or a home subscriber server (HSS). The implementation form of the network management device 13 is not limited in the examples of the disclosure.

Unlicensed frequency band resources are rich, but to guarantee fair coexistence of different radio access technologies (RAT) using this frequency band, a listen before talk (LBT) technology based on clear channel assessment (CCA) is introduced into license assisted access (LAA), and it is an important way to guarantee fair coexistence by introducing LBT into new radio based unlicensed access (NR-U).

In the development process of a wireless communication system, using the unlicensed frequency band through an LAA mechanism is proposed in 3GPP for shared spectrum. That is, using on the unlicensed frequency band is achieved with the assistance of licensed frequency bands. To guarantee coexistence with other systems, such as WiFi, on the unlicensed frequency band, a mechanism that channel detection is needed prior to data sending is also introduced into LAA, whether channels are clear needs to be detected when there are data to be sent at a sending end, and the sending end can send the data only after the channels are in a clear status.

There may be many channel detection mechanisms, taking a channel detection process in downlink transmission as an example, LBT of the category (CAT) 2 and LBT of the CAT4 that are commonly used have differences in channel detection mechanism. The channel detection mechanism of CAT2 and the channel detection mechanism of CAT4 are described respectively below.

Figure 2:
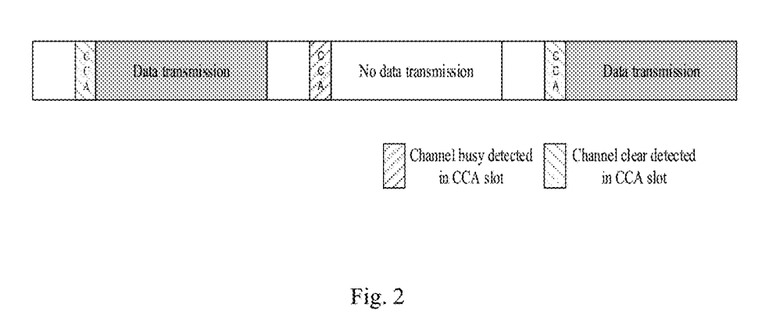
FIG. 2 is a schematic diagram of CCA illustrated according to an example.

For the channel detection mechanism of CAT2, a specific flow is that: a wireless communication device executes CCA monitoring of a single slot, and if channel clear is detected in the CCA slot, the wireless communication device may access a channel immediately; and if channel busy is detected in the CCA slot, the wireless communication device performs monitoring again until the next CCA slot, and it may access the channel immediately after the channel is clear, as shown in FIG. 2.

The channel detection mechanism of CAT4 is CCA based on random back-off. The wireless communication device uniformly and randomly generates a back-off counter N between 0 and a contention window size (CWS) and performs monitoring with a monitoring slot (CCA slot) as the granularity. The value of N is from 0 to CWS. If channel clear is detected within the monitoring slot, the back-off counter is subtracted by 1, and on the contrary, if channel busy is detected, the back-off counter is hung up, that is, the back-off counter N remains unchanged within channel busy time until channel clear is detected. When the back-off counter is subtracted to 0, the wireless communication device may occupy the channel immediately.

Figure 3:
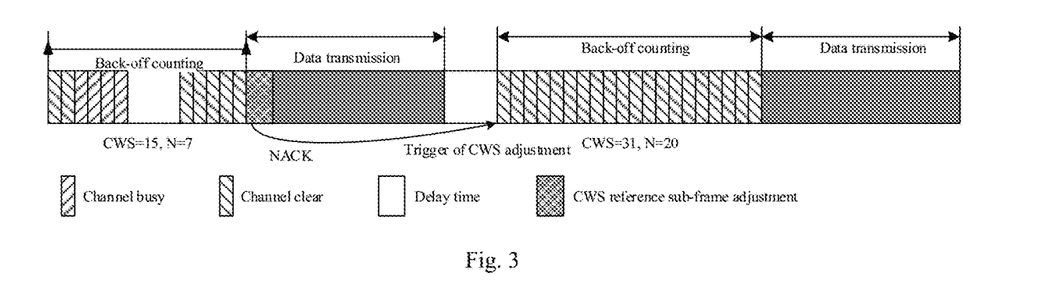
FIG. 3 is a schematic diagram of CCA illustrated according to an example.

The CWS of CAT4 is a dynamically adjustable value, and the wireless communication device dynamically adjusts the CWS according to whether previous transmission is properly received by a receiving node. In this way, an appropriate CWS value may be obtained through adjustment in accordance with a channel status and network business loads, and reducing collision of sending nodes and improving channel access efficiency are compromised. As shown in FIG. 3, the CWS corresponding to the first time of downlink physical downlink shared channel (PDSCH) transmission is equal to 15, and during the first time of downlink transmission, a user fails to receive a PDSCH successfully, so that a base station increases the CWS value to 31 according to this wrong receiving status, and this increased CWS is adopted before the second time of downlink PDSCH transmission to generate a random number N and perform channel monitoring.

Figure 4:
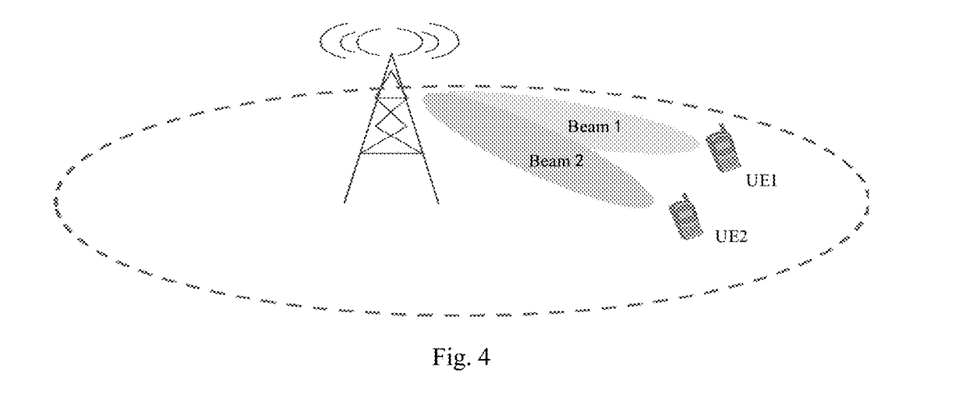
FIG. 4 is a schematic structural diagram of a wireless communication system illustrated according to an example.

FIG. 4 shows a schematic diagram of a beam-based cellular communication system, in which a base station and a terminal communicate through beams, so that space multiplexing is achieved and the system capacity is increased. In FIG. 4, the base station may perform information interaction with UE1 by using beam 1 and perform information interaction with UE2 by using beam 2.

Figure 5:
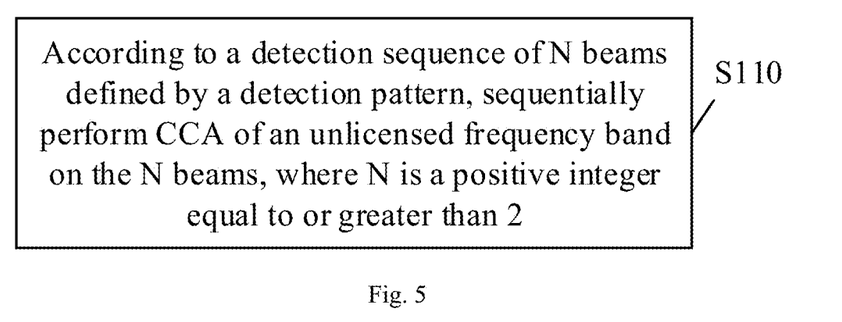
FIG. 5 is a schematic flow diagram of a channel detection method illustrated according to an example.

As for how to fuse beam communication and unlicensed frequency band communication in the cellular communication system, with reference to FIG. 5, an example of the disclosure provides a channel detection method, including:

S110, according to a detection sequence of N beams defined by a detection pattern, CCA of an unlicensed frequency band is sequentially performed on the N beams, where N is a positive integer equal to or greater than 2.

In some examples, the channel detection method provided by the example of the disclosure is applicable to a communication device containing one antenna panel. For example, the communication device includes but is not limited to: a terminal containing only one antenna panel or a base station containing only one antenna panel.

A device executing the channel detection method includes but is not limited to data sending ends such as the terminal and the base station. Here, a sending end may be the base station or terminal in the cellular communication system.

In some examples, the detection pattern at least reflects the detection sequence of the N beams. For example, the detection pattern includes: beam indexes of the N beams. An arrangement sequence of these beam indexes is the detection sequence of the N beams.

In one example, the beam indexes are beam numbers. The detection sequence of the N beams defined by the detection pattern may be: a sequence from high to low of the beam numbers of the N beams, or, a sequence from low to high of the beam numbers of the N beams.

In other examples, the detection pattern may include: a pattern formed by arranging referring graphics of the N beams in a time domain. An arrangement sequence of the referring graphics of the N beams on the time domain is the detection sequence of the N beams.

For example, the value of N may be any positive integer greater than or equal to 2. The value of N may be equal to or less than a total number M contained in the base station of the cellular communication system. For example, M beams need to be traversed in one time of scanning of a cell by the base station, while the value of N may be equal to or less than M.

It is to be noted that all the N beams work on resources of the unlicensed frequency band.

For example, in some cases, the cell of the cellular communication system has a large area, user equipment (UE), also called a terminal, has a relatively small range of activity, only several particular beams to the base station are used for communication between a certain terminal and the base station within a short period of time, and these beams are called terminal-reachable beams. At the moment, the N beams in the detection pattern may include the terminal-reachable beams.

For example, assuming N=4, beam 1 to beam 4 respectively, then the detection pattern indicates that the CCA detection sequence of the four beams is from beam 1 to beam 4 in sequence, so the detection sequence during CCA is from beam 1 to beam 4.

Detection results of CCA include: channel busy and channel clear. Channel busy illustrates that a communication device occupies a channel of an unlicensed frequency band on the beam for communication, and in order to reduce mutual interference, the channel of the unlicensed frequency band on the beam will not be occupied for communication. If channel clear is detected, it illustrates that no communication device occupies a channel of an unlicensed frequency band on the beam for communication, and a sending end can occupy the channel of the unlicensed frequency band on the beam for communication.

A manner for determining channel busy or channel clear may include: a channel of the unlicensed frequency band on the corresponding beam is monitored during CCA, and channel busy or channel clear is determined according to monitored signal strength and a strength threshold. If the monitored signal strength is greater than or equal to the strength threshold, it can be considered that the channel of the unlicensed frequency band on the beam is busy, otherwise, it can be considered that the channel on the beam is clear.

In one detection period, CCA may have multiple rounds.

In some examples, if a round of detection is traversing all the beams once, this round of detection will be stopped when no clear channel on the unlicensed frequency band is detected from traversing from beam 1 to beam 4.

In other examples, if a round of detection is traversing all the beams multiple times, after CCA from beam 1 to beam 4 is completed once, if the current number of times of traversing does not reach a maximum number of times of traversing, all the beams are traversed again from beam 1, and the CCA is performed on the traversed beams.

In some other examples, if there are data to be sent at the sending end, the CCA will be performed all the times, and beam 1 to beam 4 will be traversed repeatedly until a clear channel on the unlicensed frequency band is detected.

The CCA here may be CCA corresponding to CAT2, or CCA corresponding to CAT4.

Whether the channel of the unlicensed frequency band on the corresponding beam is clear may be known through the CCA, and the channel may be occupied for information transceiving if it is clear. Information here includes but is not limited to control signaling and/or business data.

In the examples of the disclosure, beam communication and communication using the unlicensed frequency band are introduced into the cellular communication system, prior to communication using beams on the unlicensed frequency band, channel detection, namely the CCA, is sequentially performed according to the detection sequence of the N beams defined by the detection pattern with the beams as a detection unit, and detection results are obtained. In this way, clear channels can be selected according to the detection results of the CCA, and beam communication is performed on the unlicensed frequency band, so that beam communication and unlicensed frequency band communication are well fused in the cellular communication system, and the characteristic of easy implementation is achieved.

In some examples, S110 may include:
the CCA is performed on the $(n+1)^{th}$ beam on the unlicensed frequency band according to the detection sequence of the N beams defined by the detection pattern in response to performing the CCA on the $n^{th}$ beam of the N beams and detecting channel busy of the unlicensed frequency band if n is less than N; or,
the CCA is performed on the first beam on the unlicensed frequency band according to the detection sequence of the N beams defined by the detection pattern in response to performing the CCA on the $n^{th}$ beam of the N beams and detecting channel busy of the unlicensed frequency band if n is equal to N;
where n is a natural number less than or equal to N.

The detection pattern defines the detection sequence of the N beams, and the sending end, such as the base station and the terminal, sequentially performs channel detection of the unlicensed frequency band on the beams according to the detection sequence of the N beams defined in the detection pattern.

Here, performing the CCA on the $n^{th}$ beam of the unlicensed frequency band may include:
signal monitoring is performed in a transmitting direction or a receiving direction of the $n^{th}$ beam of the unlicensed frequency band, and monitored signal strength is determined.

If the signal strength is greater than or equal to the strength threshold, it can be considered that the channel on the $n^{th}$ beam of the unlicensed frequency band is busy.

If the signal strength is less than the strength threshold, it can be considered that the channel on the $n^{th}$ beam of the unlicensed frequency band is clear.

If channel busy is detected on the $n^{th}$ beam, in order to detect a beam with a clear channel of the unlicensed frequency band as much as possible, the next beam in the N beams defined by the detection pattern will be traversed. The next beam here may be the $(n+1)^{th}$ beam or the first beam. Whether it is specifically the $(n+1)^{th}$ beam or the first beam depends on the current value of n. If n is equal to N, that is, the $n^{th}$ beam that is currently detected is the last beam in the detection pattern, the CCA is performed from the first beam. If n is less than N, the $n^{th}$ beam that is currently detected is not the last beam in the detection pattern, and other beams behind continue to be traversed.

In the example of the disclosure, the CCA on the N beams is repeated, so that if the $n^{th}$ beam that is currently detected is the last beam in the detection pattern and no clear channel is detected on the beam, channel detection on the unlicensed frequency band is performed from the first beam. In this way, polling detection of the unlicensed frequency band on the beams is achieved, so beams having clear channels on the unlicensed frequency band are detected as much as possible, and the effective utilization of frequency spectrum resources and beam resources is ensured.

In some examples, the method further includes:
channel occupancy of the unlicensed frequency band is initiated on the $n^{th}$ beam and the CCA on the unlicensed frequency band is stopped within channel occupancy time of the unlicensed frequency band in response to performing the CCA on the $n^{th}$ beam of the N beams and detecting channel clear of the unlicensed frequency band. For example, it includes but is not limited to: channel occupancy of the unlicensed frequency band is initiated on the $n^{th}$ beam and the CCA of channels on the unlicensed frequency band is stopped within the channel occupancy time of the unlicensed frequency band.

The $n^{th}$ beam successfully completing channel occupancy is used for information interaction.

If a result of CCA on the $n^{th}$ beam that is currently detected shows that a channel of the unlicensed frequency band on the $n^{th}$ beam is clear, it is illustrated that the beam on the unlicensed frequency band may be used for communication, and channel occupancy on this beam is initiated. If this channel is occupied, a channel occupancy signal may be sent on the beam, so that other communication devices will believe that the channel of the unlicensed frequency band on the beam is occupied when monitoring the occupancy signal.

If the sending end successfully occupies the $n^{th}$ beam, that is, the sending end successfully occupies the channel of the unlicensed frequency band on the $n^{th}$ beam, information interaction may be performed on the $n^{th}$ beam that is successfully occupied. Interacting information here includes but is not limited to control signaling and/or business data. The $n^{th}$ beam successfully completing channel occupancy is used for information interaction, that is, the successfully occupied beam is consistent with a beam finally used for information interaction.

After a clear channel that may be occupied is successfully detected, traversing of other beams in the detection pattern will be stopped within the channel occupancy time, so as to reduce unnecessary CCA.

In some examples, S110 may include:
according to the detection sequence of the N beams defined by the detection pattern, the CCA is sequentially performed within a detection time corresponding to the beams of the unlicensed frequency band.

The detection time is set for each single beam, and different beams may be different in duration of the detection time.

In some examples, the detection time may be a predefined number of time domain units, and each time domain unit includes but is not limited to: a symbol and/or a mini-slot.

For example, in a predefined detection pattern, it is found according to statistical data that a channel vacancy rate of the beam is relatively low, and the detection time may be shortened appropriately, so that it may be switched to the next beam to be detected as soon as possible to perform the CCA so as to find a beam having a clear channel as soon as possible.

In some examples, different beams are different in duration of the detection time; or, different beams are the same in duration of the detection time.

In some examples, the detection time may be timed through a timer. For example, the timer is started when the CCA begins to be performed on a certain beam; and if the timer times out, the CCA on the beam is ended. A timing duration of the timer here is equal to the duration of the detection time.

In some examples, in order to simplify CCA at the sending end, different beams may be set to be equal in duration of the detection time, so that when the CCA is performed at the sending end, one timer for timing of the detection time may be disposed, and the timer is restarted when detection of the next beam is performed.

In other examples, different beams are different in duration of the detection time, so each beam needs to be separately configured with a timer having different timing durations. After the CCA on the current beam is completed, the timer needs to be initialized according to timer configuration of the next beam to be detected, and then the CCA on the next beam is performed. Different beams are different in transmission direction. In some cases, different beams use different carrier frequencies on the unlicensed frequency band. At the moment, different carrier frequencies are different in load rate, and the duration of the detection time may be adjusted adaptively according to the load rate.

For example, the load rate is positively correlated or negatively correlated to the duration of the detection time. Positive correlation here includes but is not limited to a direct ratio, and negative correlation includes but is not limited to an inverse ratio. When the load rate is negatively correlated to the duration of the detection time, a beam with a relatively high load rate may be found according to a statistical probability to reduce the detection time, and once busyness is detected within a short time, it is switched to the next beam in time for the CCA to detect a beam having a clear channel on the unlicensed frequency band as soon as possible, which is also conductive to achieving load balance between the beams.

For example, it is possible that a beam with a high load rate is also a beam suitable for a great amount of terminal communication, and in order to win the communication right on the beam as much as possible and maximize the effective utilization of the beam, the load rate may be positively correlated to the duration of the detection time. In this way, a beam adapting to communication is used to the maximum by properly prolonging the duration of the detection time on the beam with the high load rate.

In some examples, S110 may include:
according to a detection sequence of the N beams defined by a pre-configured detection pattern, the CCA of the unlicensed frequency band is sequentially performed on the N beams.

The detection pattern is pre-configured, for example, the detection pattern is pre-configured at a starting moment of one communication period. Or, when a terminal initially accesses a certain base station, a detection pattern for communication of the terminal and the base station is pre-configured according to a location of the terminal in a cell.

In this way, when channel detection of the unlicensed frequency band on the beam is needed subsequently before communication, channel detection may be performed quickly according to the detection pattern so as to increase the detection rate.

In some examples, the method further includes:
the detection pattern pre-configured by the base station is received in response to that the sending end is the terminal.

If the sending end is the terminal, a large number of resources of the terminal will be occupied and the implementation difficulty is high if the terminal configures the detection pattern by itself, and the base station has the priority to pre-configure the detection pattern and informs the terminal. In this way, the terminal and the base station will share the detection pattern, and the base station and the terminal may perform the CCA before communication according to the same pre-configured detection pattern.

In some examples, the terminal receives the detection pattern through broadcast signaling, multicast signaling or unicast signaling of the base station. For example, the terminal receives the detection pattern in a system message broadcast by the base station, or, receives the detection pattern from radio resource control (RRC) signaling unicast by the base station.

In some examples, the detection pattern may be sent by the base station on a licensed frequency band, or sent after the base station successfully occupies the channel on the unlicensed frequency band.

In the example of the disclosure, if the detection pattern is sent on the licensed frequency band, it may be ensured that the terminal as the sending end receives the detection pattern in time.

If the detection pattern is sent on the unlicensed frequency band, a channel on the licensed frequency band is not occupied, and the channel on the licensed frequency band may be used for business transmission of a higher quality of service (QoS).

Figure 6:
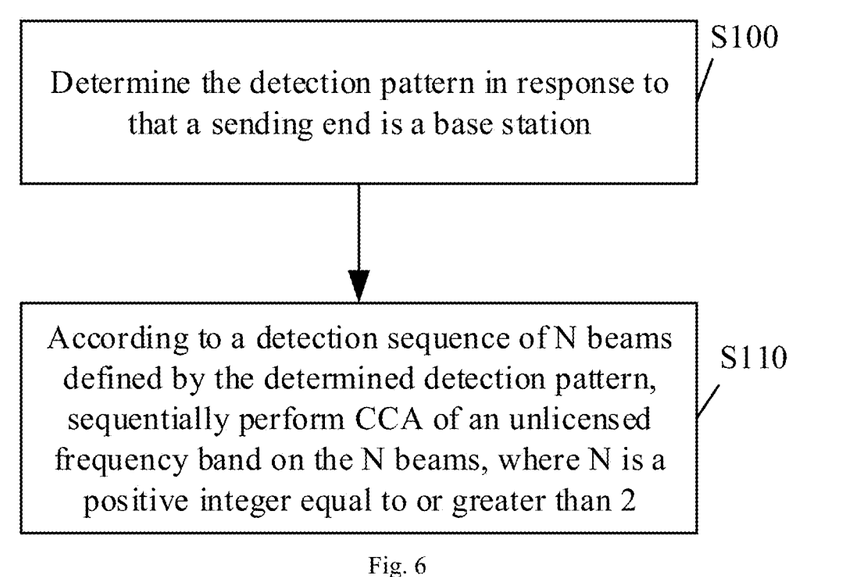
FIG. 6 is a schematic flow diagram of a channel detection method illustrated according to an example.

In some examples, as shown in FIG. 6, the method further includes:
S100: the detection pattern is determined in response to that the sending end is the base station.
S110 may include:
according to a detection sequence of the N beams defined by the determined detection pattern, the CCA of the unlicensed frequency band is sequentially performed on the N beams.

In some examples, the detection pattern may be dynamically determined by the base station. For example, the detection pattern is dynamically determined when the base station, as the sending end, has data to be sent.

The CCA of channels is sequentially performed on the beam of the unlicensed frequency band according to the detection pattern, so that channel detection is ordered, beam to be detected and/or the detection sequence can be simply and dynamically adjusted by adjusting the detection pattern, and unnecessary detection is reduced, a beam having a clear channel can be found as soon as possible, and the data transmission rate is increased.

The base station usually communicates with a plurality of terminals in a cell at the same time, the traffic or occupancy condition, etc. of current a plurality of beams may be known according to the beam using condition of the base station. Accordingly, the base station may determine the detection pattern according to the traffic and/or occupancy condition, etc. Determining the detection pattern here may at least include: determining a detection sequence of beams corresponding to the detection pattern; or, determining the beams corresponding to the detection pattern and the detection sequence of the beams.

In some examples, S100 may include:

the detection pattern is determined according to a business condition of different beams of the unlicensed frequency band.

The business condition here includes but is not limited to at least one of the following:

traffic within unit time; or a transmission frequency of business data within unit time.

For example, in some examples, S100 may include: the detection sequence of the N beams defined by the detection pattern is determined according to a traffic order of the different beams of the unlicensed frequency band within unit time.

In some examples, the traffic of the N beams within unit time is positively correlated to the detection sequence of the N beams in the detection pattern, that is, the greater the traffic of one beam within unit time, the earlier the detection sequence of the beam defined by the detection pattern.

In other examples, the traffic of the N beams within unit time is negatively correlated to the detection sequence of the N beams in the detection pattern, that is, the greater the traffic of one beam within unit time, the later the detection sequence of the beam defined by the detection pattern.

A beam with great traffic within unit time or a beam with a high number of times of transmission of business data within unit time has the higher probability that the result of the CCA is channel busy. If the above-mentioned correlation relationship of negative correlation is adopted, when the CCA is performed according to the detection pattern, it is equivalent to detecting a beam with a high probability of channel clear preferably, so that the channel occupancy rate is increased.

If the correlation relationship of positive correlation is adopted, when the CCA is performed according to the detection pattern, a beam with a high probability of channel busy is detected preferably, so that a beam with small possibility of channel occupancy may be eliminated preferably.

In some examples, the number of times of transmission of the business data of the N beams within unit time is positively correlated to the detection sequence of the N beams in the detection pattern, that is, the higher the number of times of transmission of the business data of one beam within unit time, the earlier the detection sequence of the beam defined by the detection pattern.

In other examples, the number of times of transmission of the business data of the N beams within unit time is negatively correlated to the detection sequence of the N beams in the detection pattern, that is, the higher the number of times of transmission of one beam within unit time, the later the detection sequence of the beam defined by the detection pattern.

A determining policy of dynamically determining the detection pattern according to the business condition may be pre-determined. The determining policy may decide the correlation relationship between the magnitude of the traffic within unit time and before and after the detection sequence, and the correlation relationship here includes but is not limited to positive correlation or negative correlation.

In some cases, the determining policy may be issued by network elements of a core network, or may be regulated in a communication protocol, or may be negotiated with an adjacent base station. For example, adjacent base stations may adopt different determining policies, so that the number of collision during detection is reduced. The network elements of the core network include but are not limited to a policy control function (PCF).

The method provided in the example of the disclosure is applicable to a scenario that the sending end has one antenna panel, that is, at a certain moment, the sending end has one beam for data sending or receiving.

The sending end executes the operation of channel detection on each beam according to the predefined detection pattern.

The detection pattern may be predefined, or dynamically determined according to the business distribution condition of the sending end.

In the predefinition mode, the sending end may perform the operation of channel detection on the beam according to the predefined sequence. For instance, according to the detection pattern, the sending end performs the operation of channel detection according to the serial number sequence of the beams.

In an implementation, assuming that the sending end has four beams, the sending end may execute the operation of channel detection on beam 1, beam 2, beam 3 and beam 4 in sequence.

After channel occupancy fails on a certain beam, an operation of channel occupancy is initiated again. For instance, the sending end detects the channel on beam 1 first and finds out that the channel is busy, and then detects the channel on beam 2 and finds out that the channel is clear, and occupies the channel. After channel occupancy time at this time is out, the sending end may execute the operation of channel detection again according to the sequence of beam 1, beam 2, beam 3 and beam 4; or, the operation of channel detection is executed again according to the sequence of beam 3, beam 4, beam 1 and beam 2.

In the mode of dynamically determining the detection pattern, for instance, the sending end may determine the business condition of a service user on each beam. It is found at the current moment that user equipment on beam 3 has the maximum traffic, so the sending end executes the operation of channel detection on beam 3 preferably, and then the operation of channel detection is executed on a beam with the second largest traffic.

When the sending end is the terminal, the base station may pre-configure the pattern for the terminal to execute channel detection. The sending end executes channel detection on each beam within a predefined time length to determine whether the channel on the beam is clear. Predefined time lengths on different beams may be the same or different. When the sending end is the terminal, the base station needs to pre-configure the predefined time length on each beam of the terminal.

Figure 7A:
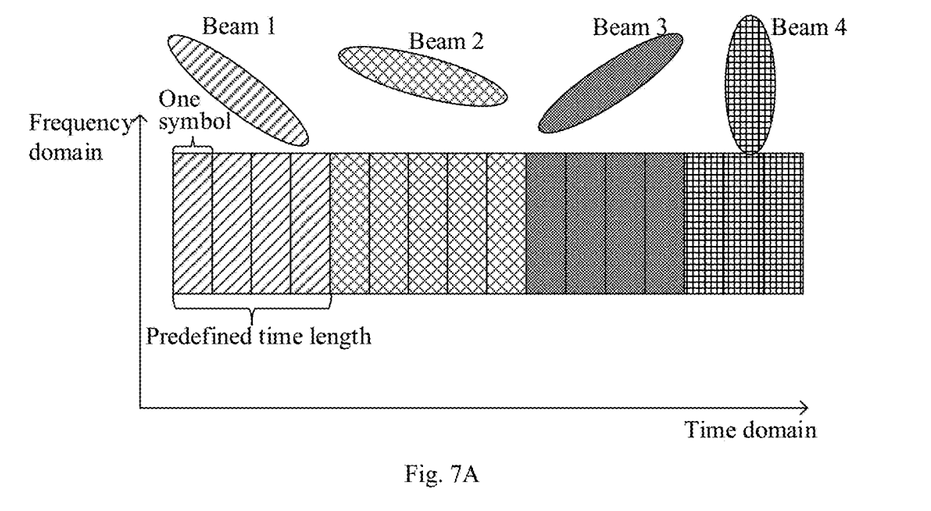
FIG. 7A is a schematic diagram of a time domain of channel detection illustrated according to an example.

As shown in FIG. 7A, the sending end supports four beams, and the sending end executes the operation of channel detection on beam 1, beam 2, beam 3 and beam 4 in sequence. Predefined detection time on the four beams is 4 symbols, 5 symbols, 4 symbols and 3 symbols.

The sending end occupies clear channels of the unlicensed frequency band on the beams.

When the sending end executes channel detection on a certain beam, after it is found that the channel on the beam is clear, the channel is successfully occupied, and channel detection on other beams is stopped within the channel occupancy time.

The beam on which the sending end executes channel detection and successfully occupies the channel is consistent with the beam for data interaction.

As shown in FIG. 7A, different beams are different in predefined time length, that is, different beams are different in time length of the detection time. The detection time of different beams is continuously distributed on the time domain.

Figure 7B:
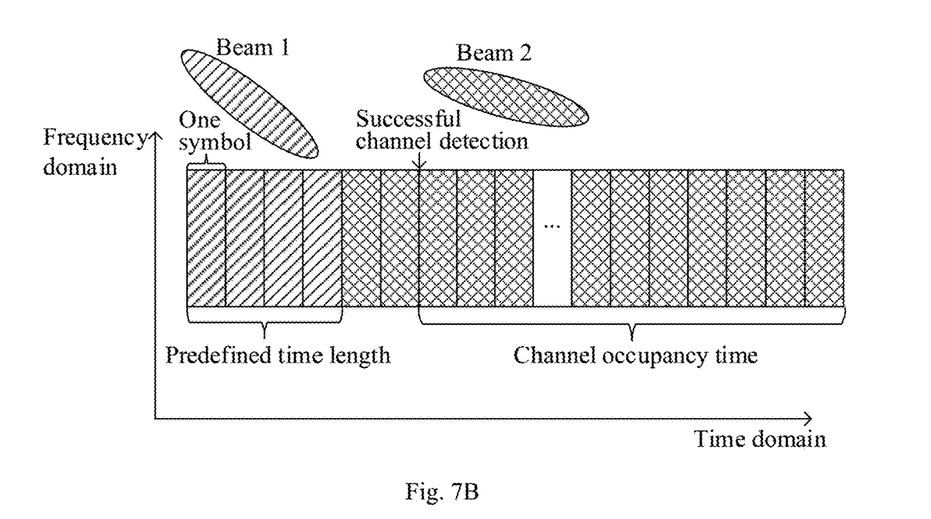
FIG. 7B is a schematic diagram of a time domain of channel detection illustrated according to an example.

As shown in FIG. 7B, beam 1 and beam 2 are traversed, that is, channel detection of the unlicensed frequency band is performed on beam 1 and beam 2 respectively. In FIG. 7B, when it is found that a clear channel of the unlicensed frequency band is detected on beam 2, beam 2 is occupied, and successfully occupied beam 2 may be used for information interaction between the sending end and a receiving end. After the channel occupancy time is out, the sending end may continue to initiate the operation of channel detection based on requirements.

Figure 8:
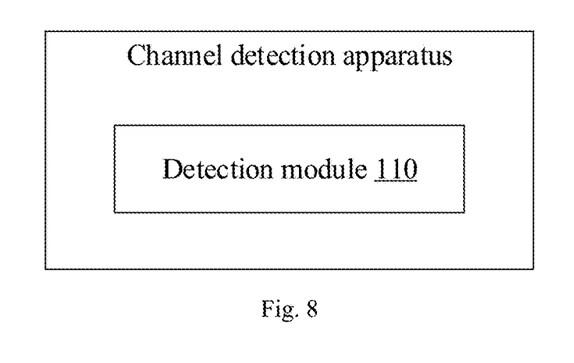
FIG. 8 is a schematic structural diagram of a channel detection apparatus illustrated according to an example.

As shown in FIG. 8, an example of the disclosure provides a channel detection apparatus, including:

a detection module 110, configured to, according to a detection sequence of N beams defined by a detection pattern, sequentially perform clear channel assessment (CCA) of an unlicensed frequency band on the N beams, where N is a positive integer equal to or greater than 2.

The channel detection apparatus may be used in a data sending end.

In some examples, the detection module 110 may be a program module. The program module, after being executed by a processor, can implement sequentially performing the CCA on the beams of the unlicensed frequency band according to the detection sequence of the N beams defined by the detection pattern.

In another example, the detection module 110 may be a software-hardware combined module, which includes but is not limited to various programmable arrays. The programmable arrays include but are not limited to: a complex programmable array or a field programmable array.

In yet another example, the detection module 110 includes but is not limited to a pure-hardware module which includes but is not limited to an application-specific integrated circuit.

In some examples, the detection module 110 is configured to perform the CCA on the $(n+1)^{th}$ beam on the unlicensed frequency band according to the detection sequence of the N beams defined by the detection pattern in response to performing the CCA on the $n^{th}$ beam of the N beams and detecting channel busy of the unlicensed frequency band if n is less than N; or, perform the CCA on the first beam on the unlicensed frequency band according to the detection sequence of the N beams defined by the detection pattern in response to performing the CCA on the $n^{th}$ beam of the N beams and detecting channel busy of the unlicensed frequency band if n is equal to N, where n is a natural number less than or equal to N.

In some examples, the apparatus further includes:
an occupancy stopping module, configured to initiate channel occupancy of the unlicensed frequency band on the $n^{th}$ beam and stop the CCA on the unlicensed frequency band within channel occupancy time of the unlicensed frequency band in response to performing the CCA on the $n^{th}$ beam of the N beams and detecting channel clear of the unlicensed frequency band.

The $n^{th}$ beam successfully completing channel occupancy is used for information interaction.

In some examples, the detection module 110 is configured to, according to the detection sequence of the N beams defined by the detection pattern, sequentially perform the CCA within a detection time corresponding to the beams of the unlicensed frequency band.

In some examples, different beams are different in duration of a detection time;
or,
different beams are the same in duration of a detection time.

In some examples, the detection module 110 is configured to, according to a detection sequence of the N beams defined by a pre-configured detection pattern, sequentially perform the CCA of the unlicensed frequency band on the N beams.

In some examples, the apparatus further includes:
a receiving module, configured to receive the detection pattern pre-configured by abase station in response to that the sending end is a terminal.

In some examples, the apparatus further includes:
an obtaining module, configured to obtain the detection pattern.

The detection module 110 is configured to, according to a detection sequence of the N beams defined by a determined detection pattern, sequentially perform the CCA of the unlicensed frequency band on the N beams.

In some examples, the obtaining module is configured to determine the detection pattern according to the business condition of different beams of the unlicensed frequency band.

In some examples, the obtaining module is configured to determine the detection sequence of the N beams defined by the detection pattern according to a traffic order of the different beams of the unlicensed frequency band within unit time.

An example of the present disclosure provides a communication device, including a processor, a transceiver, a memory and an executable program stored on the memory and capable of being operated by the processor. The executable program, when operated by the processor, executes the channel detection method provided by any aforementioned technical solution, such as at least one of the methods shown in FIG. 5 and/or FIG. 6.

The communication device may be a base station.

The processor may include storage medium of various types. The storage medium are non-transitory computer storage medium, and can continue to memorize information stored after the communication device is powered down. Here, the communication device includes a base station or user equipment.

The processor may be connected with the memory via a bus and the like, and is configured to read the executable program stored on the memory, such as at least one of the methods shown in FIG. 5 and/or FIG. 6.

An example of the present disclosure provides a non-transitory computer storage medium, storing an executable program. The executable program, after being executed by a processor, can implement the channel detection method provided by any aforementioned technical solution, such as at least one of the methods shown in FIG. 5 and/or FIG. 6.

Figure 9:
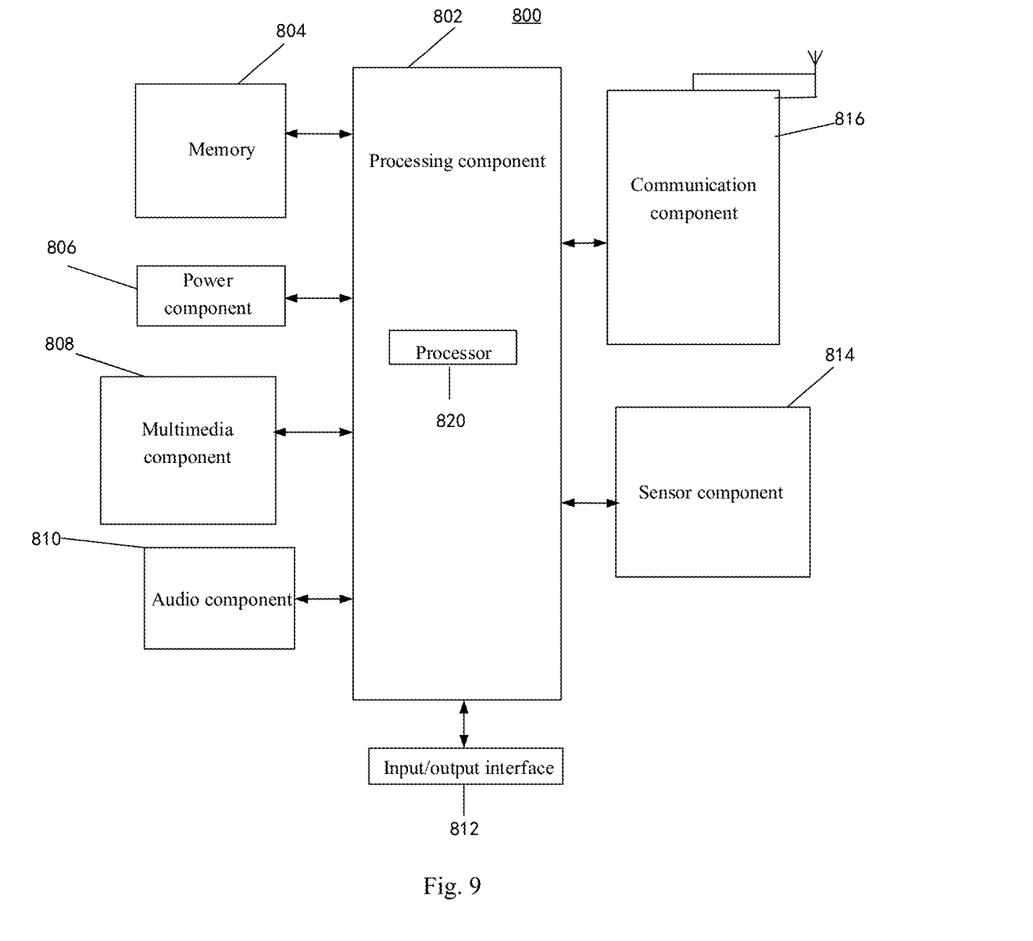
FIG. 9 is a schematic structural diagram of a terminal illustrated according to an example.

FIG. 9 is a block diagram of UE (also referred to as a terminal) 800 illustrated according to an example. For example, the UE 800 may be a mobile phone, a computer, digital broadcasting user equipment, a message transceiving device, a game console, a tablet device, a medical device, a fitness device, a personal digital assistant, etc.

Referring to FIG. 9, the UE 800 may include one or more of the following components: a processing component 802, a memory 804, a power component 806, a multimedia component 808, an audio component 810, an input/output (I/O) interface 812, a sensor component 814, and a communication component 816.

The processing component 802 typically controls the overall operation of the UE 800, such as operations associated with display, telephone call, data communication, camera operations, and recording operations. The processing component 802 may include one or more processors 820 to execute instructions to complete all or part of the steps of the above method. In addition, the processing component 802 may include one or more modules to facilitate interaction between the processing component 802 and other components. For example, the processing component 802 may include a multimedia module to facilitate interaction between the multimedia component 808 and the processing component 802.

The memory 804 is configured to store various types of data to support operations at the UE 800. Examples of these data include instructions for any application or method operating on the UE 800, contact data, phonebook data, messages, pictures, videos, etc. The memory 804 may be implemented by any type of volatile or nonvolatile storage device or their combination, such as a static random access memory (SRAM), an electrically erasable programmable read only memory (EEPROM), an erasable programmable read only memory (EPROM), a programmable read only memory (PROM), a read only memory (ROM), a magnetic memory, a flash memory, a magnetic disk or optic disk.

The power component 806 provides power for various components of the UE 800. The power component 806 may include a power management system, one or more power sources and other components associated with generating, managing and distributing power for the UE 800.

The multimedia component 808 includes a screen providing an output interface between the UE 800 and a user. In some examples, the screen may include a liquid crystal display (LCD) and a touch panel (TP). If the screen includes the touch panel, the screen may be implemented as a touch screen to receive an input signal from the user. The touch panel includes one or more touch sensors to sense touch, sliding and gestures on the touch panel. The touch sensor can not only sense the boundary of the touch or sliding motion, but also detect the duration and pressure related to the touch or sliding operation. In some examples, the multimedia component 808 includes a front camera and/or a rear camera. When the UE 800 is in an operation mode, such as a shooting mode or a video mode, the front camera and/or the rear camera can receive external multimedia data. Each front camera and rear camera can be a fixed optical lens system or have a focal length and optical zoom capability.

The audio component 810 is configured to output and/or input audio signals. For example, the audio component 810 includes a microphone (MIC) configured to receive an external audio signal when the UE 800 is in the operation mode, such as a call mode, a recording mode, and a speech recognition mode. The received audio signal may be further stored in the memory 804 or transmitted via the communication component 816. In some examples, the audio component 810 also includes a speaker for outputting the audio signal.

The I/O interface 812 provides an interface between the processing component 802 and a peripheral interface module which can be a keyboard, a click wheel, a button, etc. These buttons may include but are not limited to: a home button, volume buttons, a start button and a lock button.

The sensor component 814 includes one or more sensors for providing state evaluation of various aspects of the UE 800. For example, the sensor component 814 can detect an on/off state of the UE 800 and the relative positioning of the components, for example, the component is a display and a keypad of the UE 800. The sensor component 814 can also detect the change of the position of the UE 800 or one component of the UE 800, the presence or absence of user contact with the UE 800, the azimuth or acceleration/deceleration of the UE 800, and temperature change of the UE 800. The sensor component 814 may include a proximity sensor configured to detect the presence of nearby objects without any physical contact. The sensor component 814 may further include an optical sensor, such as a CMOS or CCD image sensor, for use in imaging applications. In some examples, the sensor component 814 may further include an acceleration sensor, a gyroscope sensor, a magnetic sensor, a pressure sensor, or a temperature sensor.

The communication component 816 is configured to facilitate wired or wireless communication between the UE 800 and other devices. The UE 800 may access a wireless network based on a communication standard, such as WiFi, 2G or 3G, or their combination. In an example, the communication component 816 receives a broadcast signal or broadcast-related information from an external broadcast management system via a broadcast channel. In an example, the communication component 816 further includes a near field communication (NFC) module to facilitate short-range communication. For example, the NFC module may be implemented based on radio frequency identification (RFID) technology, infrared data association (IrDA) technology, ultra-wideband (UWB) technology, Bluetooth (BT) technology and other technologies.

In an example, the UE 800 may be implemented by one or more application-specific integrated circuits (ASICs), digital signal processors (DSPs), digital signal processing devices (DSPDs), programmable logic devices (PLDs), field programmable gate arrays (FPGAs), controllers, microcontrollers, microprocessors, or other electronic elements for performing the above method.

In an example, a non-transitory computer-readable storage medium including instructions, such as the memory 804 including instructions, which can be executed by the processor 820 of the UE 800 to complete the above method, is also provided. For example, the non-transitory computer-readable storage medium may be a ROM, a random access memory (RAM), a CD-ROM, a magnetic tape, a floppy disk, an optical data storage device, etc.

Figure 10:
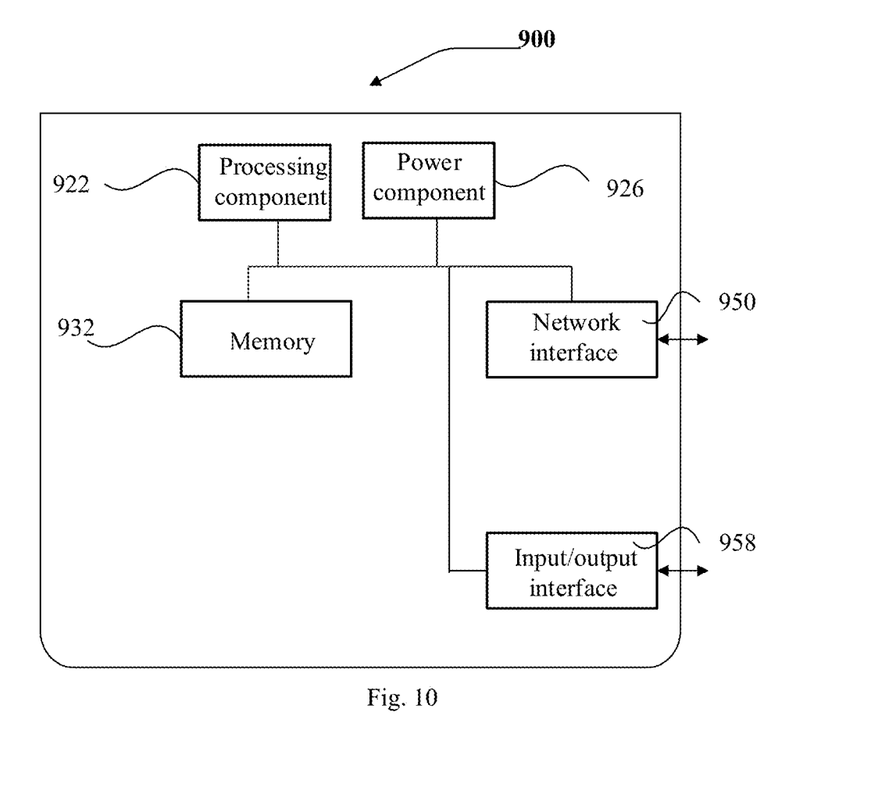
FIG. 10 is a schematic structural diagram of a base station illustrated according to an example.

As shown in FIG. 10, an example of the disclosure shows a structure of a base station, TPR, or LMF. For example, the base station 900 may be provided as a network side device. Referring to FIG. 10, the base station 900 includes a processing component 922, which further includes one or more processors, and a memory resource represented by a memory 932 for storing instructions, such as applications, that can be executed by the processing component 922. The applications stored in the memory 932 may include one or more modules each corresponding to a set of instructions. In addition, the processing component 922 is configured to execute instructions to execute any method applied to the base station above, such as the methods shown in FIGS. 5-6.

The base station 900 may further include a power component 926 configured to perform power management of the base station 900, a wired or wireless network interface 950 configured to connect the base station 900 to the network, and an input/output (I/O) interface 958. The base station 900 can operate an operating system based on the memory 932, such as Windows Server™ Mac OS X™, Unix™, Linux™, FreeBSD™, or the like.

Other implementation solutions of the disclosure will be apparent to those skilled in the art from consideration of the specification and practice of the disclosure disclosed here. The disclosure is intended to cover any variations, uses, or adaptations of the disclosure following the general principles of the disclosure and including such departures from the disclosure as come within known or customary practice in the art. It is intended that the specification and examples are considered as illustrative.

It will be appreciated that the disclosure is not limited to the exact construction that has been described above and illustrated in the accompanying drawings, and that various modifications and changes may be made without departing from the scope of the disclosure. It is intended that the scope of the disclosure be limited by the appended claims.

What is claimed is:

1. A channel detection method, comprising:
    obtaining a detection pattern; and
    according to a detection sequence of N beams defined by the detection pattern, sequentially performing clear channel assessment (CCA) of an unlicensed frequency band on the N beams, wherein N is a positive integer equal to or greater than 2;
    wherein obtaining the detection pattern comprises:
    determining the detection pattern according to a business condition of different beams of the unlicensed frequency band;
    wherein determining the detection pattern according to the business condition of the different beams of the unlicensed frequency band comprises:
    determining the detection sequence of the N beams defined by the detection pattern according to a traffic order of the different beams of the unlicensed frequency band within unit time.

2. The method according to claim 1, wherein according to the detection sequence of the N beams defined by the detection pattern, sequentially performing the CCA of the unlicensed frequency band on the N beams comprises one of:
    performing the CCA on the $(n+1)^{th}$ beam on the unlicensed frequency band according to the detection sequence of the N beams defined by the detection pattern in response to performing the CCA on the $n^{th}$ beam of the N beams and detecting channel busy of the unlicensed frequency band in response to determining that n is less than N;
    or,
    performing the CCA on the first beam on the unlicensed frequency band according to the detection sequence of the N beams defined by the detection pattern in response to performing the CCA on the $n^{th}$ beam of the N beams and detecting channel busy of the unlicensed frequency band in response to determining that n is equal to N;
    wherein n is a natural number less than or equal to N.

3. The method according to claim 2, further comprising:
    initiating channel occupancy of the unlicensed frequency band on the $n^{th}$ beam and stopping the CCA on the unlicensed frequency band within channel occupancy time of the unlicensed frequency band in response to performing the CCA on the $n^{th}$ beam of the N beams and detecting channel clear of the unlicensed frequency band;
    wherein the $n^{th}$ beam successfully completing channel occupancy is used for information interaction.

4. The method according to claim 1, wherein according to the detection sequence of the N beams defined by the detection pattern, sequentially performing the CCA of the unlicensed frequency band on the N beams comprises:
    according to the detection sequence of the N beams defined by the detection pattern, sequentially performing the CCA within a detection time corresponding to beams of the unlicensed frequency band.

5. The method according to claim 1, wherein the different beams are different in duration of a detection time.

6. The method according to claim 1, wherein
    according to the detection sequence of the N beams defined by the detection pattern, sequentially performing the CCA of the unlicensed frequency band on the N beams comprises:
    according to a detection sequence of the N beams defined by a pre-configured detection pattern, sequentially performing the CCA of the unlicensed frequency band on the N beams.

7. The method according to claim 1, wherein
    according to the detection sequence of the N beams defined by the detection pattern, sequentially performing the CCA of the unlicensed frequency band on the N beams comprises:
    according to a detection sequence of the N beams defined by a determined detection pattern, sequentially performing the CCA of the unlicensed frequency band on the N beams.

8. A communication device, comprising:
    a transceiver;
    a memory; and
    one or more processors collectively connected with the transceiver and the memory respectively, wherein the one or more processors, when collectively executing computer-executable instructions on the memory, are collectively configured to control wireless signal transceiving of the transceiver and are collectively configured to:
    obtain a detection pattern; and
    according to a detection sequence of N beams defined by the detection pattern, sequentially perform clear channel assessment (CCA) of an unlicensed frequency band on the N beams, wherein N is a positive integer equal to or greater than 2;
    wherein obtaining the detection pattern comprises:
    determining the detection pattern according to a business condition of different beams of the unlicensed frequency band;
    wherein determining the detection pattern according to the business condition of the different beams of the unlicensed frequency band comprises:
    determining the detection sequence of the N beams defined by the detection pattern according to a traffic order of the different beams of the unlicensed frequency band within unit time.

9. A non-transitory computer storage medium storing computer-executable instructions, wherein the computer-executable instructions, when executed by one or more processors, cause the one or more processors to:

obtain a detection pattern; and according to a detection sequence of N beams defined by the detection pattern, sequentially perform clear channel assessment (CCA) of an unlicensed frequency band on the N beams, wherein N is a positive integer equal to or greater than 2;

wherein obtaining the detection pattern comprises:

determining the detection pattern according to a business condition of different beams of the unlicensed frequency band;

wherein determining the detection pattern according to the business condition of the different beams of the unlicensed frequency band comprises:

determining the detection sequence of the N beams defined by the detection pattern according to a traffic order of the different beams of the unlicensed frequency band within unit time.

10. The method according to claim 1, wherein the different beams are the same in duration of a detection time.

11. The communication device according to claim 8, wherein the one or more processors are collectively further configured to:

perform the CCA on the $(n+1)^{th}$ beam on the unlicensed frequency band according to the detection sequence of the N beams defined by the detection pattern in response to performing the CCA on the $n^{th}$ beam of the N beams and detecting channel busy of the unlicensed frequency band in response to determining that n is less than N;

or, perform the CCA on the first beam on the unlicensed frequency band according to the detection sequence of the N beams defined by the detection pattern in response to performing the CCA on the $n^{th}$ beam of the N beams and detecting channel busy of the unlicensed frequency band in response to determining that n is equal to N;

wherein n is a natural number less than or equal to N.

12. The communication device according to claim 11, wherein the one or more processors are collectively further configured to:

initiate channel occupancy of the unlicensed frequency band on the $n^{th}$ beam and stop the CCA on the unlicensed frequency band within channel occupancy time of the unlicensed frequency band in response to performing the CCA on the $n^{th}$ beam of the N beams and detecting channel clear of the unlicensed frequency band;

wherein the $n^{th}$ beam successfully completing channel occupancy is used for information interaction.

13. The communication device according to claim 8, wherein the one or more processors are collectively configured to:

according to the detection sequence of the N beams defined by the detection pattern, sequentially perform the CCA within a detection time corresponding to the beams of the unlicensed frequency band.

14. The communication device according to claim 8, wherein the one or more processors are collectively configured to:

according to a detection sequence of the N beams defined by a pre-configured detection pattern, sequentially perform the CCA of the unlicensed frequency band on the N beams.

15. The communication device according to claim 8, wherein the one or more processors are collectively configured to:

according to a detection sequence of the N beams defined by a determined detection pattern, sequentially perform the CCA of the unlicensed frequency band on the N beams.

16. The non-transitory computer storage medium according to claim 9, wherein the one or more processors are collectively further configured to:

perform the CCA on the $(n+1)^{th}$ beam on the unlicensed frequency band according to the detection sequence of the N beams defined by the detection pattern in response to performing the CCA on the $n^{th}$ beam of the N beams and detecting channel busy of the unlicensed frequency band in response to determining that n is less than N;

or, perform the CCA on the first beam on the unlicensed frequency band according to the detection sequence of the N beams defined by the detection pattern in response to performing the CCA on the $n^{th}$ beam of the N beams and detecting channel busy of the unlicensed frequency band in response to determining that n is equal to N;

wherein n is a natural number less than or equal to N.

* * * * *